United States Patent [19]

McNeff

[11] Patent Number: 5,279,838
[45] Date of Patent: Jan. 18, 1994

[54] METHOD FOR PROCESSING FEED GRAINS

[75] Inventor: Larry C. McNeff, Hopkins, Minn.

[73] Assignee: SarTec Corporation, Anoka, Minn.

[21] Appl. No.: 654,377

[22] Filed: Sep. 26, 1984

[51] Int. Cl.$^5$ .............................................. A23K 1/00
[52] U.S. Cl. ..................................... 426/2; 426/507;
426/511; 426/518; 426/623; 426/630; 426/807;
514/461
[58] Field of Search .................. 426/2, 630, 633, 635,
426/518, 564, 511, 807, 507, 623; 514/461, 462;
424/182, 241; 536/6, 6.1

[56] References Cited
U.S. PATENT DOCUMENTS

| | | | |
|---|---|---|---|
| 282,032 | 7/1983 | Alpaugh | 536/6.1 |
| 2,785,107 | 3/1957 | Krider | 536/6 |
| 3,144,337 | 8/1964 | McKeen et al. | 424/346 |
| 3,438,780 | 4/1969 | Singer | 426/564 |
| 3,615,653 | 10/1971 | Fults et al. | 426/623 |

FOREIGN PATENT DOCUMENTS

| | | | |
|---|---|---|---|
| 0051851 | 3/1983 | Japan | 426/623 |
| 2118017 | 10/1983 | United Kingdom | 426/623 |

OTHER PUBLICATIONS

Hawley, "The Condensed Chemical Dictionary", Van Nostrand Reinhold Co. (1982) pp. 314–315 and 1095.
Haekh Chemical Dictionary, McGraw Hill Book Co., Fourth Edition (1984) p. 650.
The Merck Index, Tenth Edition, Monographs Nos. 4509, 8215, 8218, 8228 and 8393.
Hale et al. (Proc. Soc. Exp. Biol. Med., 106:486, 1961).

*Primary Examiner*—R. B. Penland
*Attorney, Agent, or Firm*—Merchant, Gould, Smith, Edell, Welter & Schmidt

[57] ABSTRACT

A method of treating livestock animal feed grains by the addition thereto of a sarsasaponin as a wetting agent in conjunction with the mechanical processing to which feed grains are subjected. A preferred sarasasaponin is that extracted from the Yucca plant. Preferably the sarsasaponin is applied from a liquid medium. The sarsasaponin facilitates moisture uptake by the grain, making it more stable, more palatable and more digestible. When fed to livestock, faster weight gains are obtained with less feed. The wetting agent is desirably added to the grain prior to processing by grinding or rolling and steam flaking.

20 Claims, No Drawings

METHOD FOR PROCESSING FEED GRAINS

BACKGROUND OF THE INVENTION

1. Field of the Invention

This invention is directed to a method for tempering feed grains for livestock animals in association with other processing, or for both tempering and adding digestive benefits to the grain. More specifically, the invention is directed to a method for processing feed grains by the addition as wetting agents of sarsasaponins extracted from Yucca plants.

Animal scientists and cattle feeders have evolved numerous grain processing methods in an attempt to optimize the efficiency of animal growth per unit of grain fed. Some of the methods employed in processing feed grains are grinding, rolling, reconstituting, and steam flaking. Water is often added as a tempering agent before or during the processing by direct liquid application and/or as steam. Processing is disruptive to the grain kernel organization. Grinding and rolling reduce the particle size of the grain kernels. Steam flaking, micronizing (dry heating) and reconstitution disrupt the microscopic integrity of the kernel structure. Animals masticate grain kernels mixing the feed with saliva as they do so. Digestion of the feed takes place at the sub-microscopic level and involves the biochemical breaking of molecular structures. Macroscopic and microscopic disruption of the kernel, along with wetting, are predigestive steps which can be achieved by the mechanical and physical processing techniques already described. By achieving the predigestive disruption prior to feeding the feedstuffs, the amount of feed required to produce a unit of animal body tissue is reduced. Feed efficiency is increased.

Feed processing is an added cost to the feedstuff due to the cost of energy expended, equipment maintenance, person hours, etc. Processing is economically feasible only when the increased cost of the feedstuff is more than offset by the reduced pounds of the feedstuff required to yield a pound of animal weight gain. Energy requirements of processing contributes much of the added cost. Steam flaking represents one of the most costly processing methods employed on a large scale in beef cattle feeding operations. Steam flaking also effects the largest increase in feed efficiency. The quantity of steam injected into the feed is minimized and the through-put (tons per hour) is maximized to hold down the added cost. Wetting agents are used to facilitate the absorption of moisture into the grain. A flaking aid, such as a wetting agent, is employed by a large majority of feedlots.

Saponins in general and sarsasaponins, and their sapogenin and sarsasapogenin derivatives, are well known substances (*The Merck Index*, Tenth Edition, Monographs Nos. 4509, 8215, 8218, 8228 and 8393). Saponins are known to be wetting agents. They have not been employed as flaking aids or otherwise in the treatment of grain for processing. Sarsasaponins are a special class of saponins. The sarsasaponins contain a steroid whereas other saponins do not. The steroid portion of saponins (sapogenins) are not wetting agents. Steroids are fat soluble, making them ideally suited for promoting moisture penetration of oil containing feed grains, most of which are protected by a wax-like coating. Steroids (sapogenins) are not readily soluble in water. Saponins are polar, readily water soluble, and reduce the surface tension of water and exhibit the classic characteristics of wetting agents.

Sarsasaponins are known to enhance gain and feed efficiency when incorporated into the rations of feedlot cattle. It is one objective of this invention to utilize the wetting properties of the sarsasaponins extracted from the plants of the family: Lillaecae, genus: Yucca to increase the rate of moisture uptake by feed grains prior to and during processing. It is a further objective of this invention to introduce sarsasponins into the ratios without destruction of their chemical characteristics, thus leaving them intact in the diet where they may serve as feed and gain enhancers. The increase in feed efficiency due to the addition of sarsasaponins during processing of the feed grain is at least as great as that which has been demonstrated when they are introduced into the ruminant diet by inclusion in protein supplements.

2. The Prior Art

Hale et al (Proc. Soc. Exp. Biol. Med. 106:486, 1961) have demonstrated that the steroid portions (sapogenins) of some of the sarsasaponins improve gain and feed efficiency when included in the diets of ruminant animals.

McKeen et al (Pfizer U.S. Pat. No. 3,144,337) disclose among others that sarsasapogenin, in the form of its glycoside sarsasaponin, may be admixed with a component (grain) of an animal's feed in amount from 0.1 to 24 grams per ton of feed to promote animal growth. However, use of saponins is discouraged because of possible toxicity of saponins. Use of sapogenins is advised. Sapogenins are not readily soluble in water and are not wetting agents. Accordingly, McKeen et al do not and cannot rely on the non-existent wetting agent property of their sapogenins in achieving their claimed stimulated animal growth. Since they advise against use of saponins, there is no accidental or inherent use of the wetting agent property of sarsasaponin. The biological activity of the sapogenins is not a function of a wetting agent.

SUMMARY OF THE INVENTION

Broadly stated, the invention comprises the method of processing livestock animal feed grains which comprises adding a small but effective amount of a sarsasaponin to the grain as a wetting agent in association with mechanical processing of the grain. The preferred sarsasaponin is extracted from the Yucca plant of the family Lillaecae. The sarasaponin may be added at two weight levels, a lower level for its wetting agent and tempering functions, or a higher level for enhancing the digestability of the grain in addition to its wetting agent and tempering functions. For thorough uniform admixture, the sarsasaponin is desirably added to the grain from a liquid aqueous medium, preferably including an antifreeze agent. The typical mechanical processing steps to which the grain is subjected include in sequence grinding or rolling to disrupt the kernel organization, steam flaking to add moisture, and mixing with other feed ingredients and components. Although the wetting agent is preferably added prior to mechanical processing, it may be added at any stage in the preparation of the grain for feeding.

DETAILED DESCRIPTION OF THE PREFERRED EMBODIMENT

The addition of sarasasaponin to feed grain for livestock animals performs two functions. It acts as a wetting agent to facilitate the addition of moisture to render the feed more palatable, more digestible and more stable. It also permits faster weight gains with less feed. When applied in preferred liquid form, a more uniform distribution is assured increasing the chance of uniform sarasasaponin intake. Ration sorting, which often occurs with pelleted supplements, is eliminated. All cattle or other livestock in the pen are exposed to sarsasaponins special increased feed efficiency benefits. For feed grain processing sarsasaponins are unique in providing both improved wetting agent function and benefits to improved feed conversion in a single product. The introduction of the sarasasaponins prior to processing by steam flaking, dry rolling, etc. with the unexpected result of maintaining compound integrity is heretofore unknown. Analytical procedures show that these sarasasaponins exhibit the same chemical characteristics before and after being subjected to feed grain processing methods. The sarsasaponins are more water soluble, and thus are more capable of mitigating the stresses exerted on a microbial fermentation than the sapogenins.

In the preferred form, the sarsasaponins are added to the grain in a liquid medium. An exemplary liquid form of sarsasaponin is sold under the trademark SarTemp by SarTec Corporation of Anoka, Minn. It is prepared by blending an aqueous extract of the plants of the family: Lillaecae, genus: Yucca, or other appropriate Yucca plants containing 10% solids with antifreeze agents such as calcium chloride, propylene glycol, and the like, to depress the freezing point to −30° F. The final concentration of Yucca soluble solids is 8.25%. Its physical data are:

| Bulk density | 10.4 lbs. per gallon |
| --- | --- |
| Color | Dark brown |
| Freezing Point | −30° F. |
| Sarsasaponin Content | 390 grams per gallon (3 grams per ounce) |
| pH | 5.5–6.0 |
| Total solids | 33% |
| Water | 67% |

For grain tempering this liquid material is applied at the rate of 3–4 fluid ounces (9 to 12 grams dry weight) per ton of grain. For grain tempering plus sarsasaponin digestive benefits, it is applied at the rate of 5–6.5 fluid ounces (15 to 20 grams dry weight) per ton of grain. Even when applied at the lower grain tempering rate, the growth improving properties of the sarsasaponins are retained in the treated grain, but at a lower level. Lesser amounts of sarsasaponin, as low as 1 gram per ton dry weight, may be used but with decreased effectiveness. Larger amounts than 20 grams per ton may also be used, but are not cost effective. It can be added to grain either at the roller mill, before entering the surge bin of the steam flaker, directly to grain before storage, or directly to the mixer. It should be blended with enough water to achieve the desired moisture level in the processed grain. The solution may then be applied as a surface spray.

Shrinkage is a loss incurred while conveying and processing feed grain. Such losses are the result of dust and fines. Not only are these dusts an economic loss of physical property, but they are atmospheric pollutants. Workers in and around the processing facilities and animals consuming such dusty rations are stressed. The fines also tend to blow out of the feed bunk. Sarsasaponins, because of their wetting properties, permit the application of smaller amounts of water than would otherwise be required to reduce the fines and dust problems. If enough water is applied to reduce the dustings, etc., freezing, molding and other physical handling problems arise. By inclusion of the sarsasaponin, less water is required. Shrinkage and pollution can thus be controlled. Most wetting formulas commercially available as flaking aids contain volatile organic acids (propionic acid) to ensure stability of the formula against spoiling and molding. These volatile acids are corrosive to processing equipment and are released into the atmosphere. Sarsasaponins, in general, and the exemplary SarTemp formulation, specifically, are non-volatile and, therefore, are not lost as corrosive agents into the atmosphere.

Feedlot research has clearly demonstrated the benefits derived when sarsasaponin is introduced directly into cattle rations. More than 10% weight gain has been achieved with more than 2.5% less feed. In steam chest trials, moisture uptake in sarsasaponin treated corn increased as much as 63% to over 300% as compared with untreated grain.

Sarsasaponins useful in the present invention may also be extracted from plants of the family: Amaryllidaccae, genus: Agave, which grows extensively in the southwestern United States and in Mexico.

The invention is further illustrated by the following examples:

EXAMPLE I

The moisture uptake of treated and untreated corn was measured. A spray dried water soluble extract of the plants of the family: Lillaecae, genus: Yucca, (1.3 grams) was dissolved in water and diluted to a total volume of one liter (Solution SA). One ml of water and one ml of SA were added to 100 g of whole corn and mixed. The sample was then exposed to steam at the prevailing atmospheric pressure for ten minutes and two minutes. Other samples of corn were treated with 2 ml of water and mixed. These samples were also subsequently exposed to steam for 10 and 2 minutes. Increased moisture content as measured by weight increase was determined and listed:

| Exposure | Weight increase (grams) per 100 g corn | | |
| --- | --- | --- | --- |
| | (Min) | SA | Water |
| | 10 | 6.1 | 5.7 |
| | 2 | 4.7 | 4.1 |

At 10 minutes exposure the moisture uptake of the sarsasaponin treated samples was 70.2% greater than that of the untreated samples. At 2 minutes exposure the moisture uptake was only 14.6%.

EXAMPLE II

The moisture uptake of larger samples of treated and untreated corn exposed to greater amounts of sarsasaponin (SA) and water was measured. The corn samples were treated with water or SA and exposed to steam for 2 minutes. The weight increase of the samples were determined and are listed:

| Sample: | Treatment: | | Weight increase: (grams) | |
| --- | --- | --- | --- | --- |
| Corn (grams) | SA (ml) | Water (ml) | SA | Water |
| 200 | 2 | — | 20.7 | — |
| 200 | — | 2 | — | 11.8 |

| Sample: | Treatment: | | Weight increase: (grams) | |
|---|---|---|---|---|
| Corn (grams) | SA (ml) | Water (ml) | SA | Water |
| 500 | 5 | — | 23.1 | — |
| 500 | — | 5 | — | 13.7 |

The moisture uptake of the sarsasaponin treated samples was 75.4% and 68.6% greater than the untreated samples of 200 and 500 grams, respectively.

EXAMPLE III

The moisture uptake of corn samples treated with sarsasaponin from Yucca extract as in Example I (SA) and the proprietary material SarTemp (ST) was compared with untreated samples. A diluted solution of SarTemp (1.39 g/l) was prepared. Corn samples (500 g) were treated with water, SA, or ST and exposed to steam for 2 minutes. The increase in weight was determined and is tabulated:

| Water (ml) | SA (ml) | ST (ml) | Weight increase (grams) |
|---|---|---|---|
| 15 | — | — | 7 |
| 10 | 5 | — | 22.7 |
| 5 | — | 10 | 10.2 |

The moisture uptake of the sarsasaponin extract treated sample was 324% greater than the untreated samples. The moisture uptake of the SarTemp treated sample was 145% greater than the untreated sample. However, the SA solution was about 4.5 times more concentrated than the ST solution.

EXAMPLE IV

The increase in moisture in 500 g samples of corn in a laboratory scale steam chest as between that which was untreated and that treated with SarTemp (ST) was compared in several trials. Liquid ST was added to the corn at the rate of 6.6 ounces per ton equal to 20.1 grams sarsasaponin dry weight per ton of corn. 1% moisture was added to the corn prior to introduction into the steam chamber. The results were as follows:

| Trial | Untreated | ST |
|---|---|---|
| 1 | 2.1 | 3.9 |
| 2 | 1.8 | 5.0 |
| 3 | 3.8 | 4.0 |
| 4 | 2.9 | 4.6 |
| Average | 2.7 ± 0.7 | 4.4 ± 0.5 |
| Difference | | +1.7 |
| % Increase | | 62.9% |

Adding sarsasaponin in liquid medium from SarTemp increased moisture approximately 63% over uptake in corn grain by untreated samples.

EXAMPLE V

The possible effect of steam flaking on the chemical characteristics of sarsasaponin was evaluated. Wheat grain was treated with SarTemp (ST) and processed by steam flaking. A thin layer chromatogram of the butanol extract of ST and wheat (6.6 oz/ton ST) have identical moving concentrations of saponin, relative to the solvent front. Steam flaking has not altered the chemical characteristics of this saponin fraction of the ST.

EXAMPLE VI

The performance of steers fed sarsasaponin treated and untreated flaked corn rations was compared in an extensive feedlot test. A total of 40 steers were fed over a period of 130 days. The results of the trial are shown:

| | Average Weights | |
|---|---|---|
| | Control | Sarsasaponin |
| Initial weight lbs. | 746 | 746 |
| Final weight lbs. | 1063 | 1095 |
| Total gain lbs. | 317 | 349 |
| Average daily gain lbs. | 2.44 | 2.69 |
| Total air dry feed lbs. | 21.5 | 23.06 |
| Feed/lb. Gain lbs. | 8.19 | 7.96 |

Whereas control group cattle required 8.19 pounds of feed per pound of gain, sarsasaponin-fed cattle required only 7.96 pounds of feed per pound of gain. The sarsasaponin-fed cattle showed 10.1% greater gain which was achieved with only 97.2% as much feed.

It is apparent that many modifications and variations of this invention as hereinbefore set forth may be made without departing from the spirit and scope thereof. The specific embodiments described are given by way of example only and the invention is limited only by the terms of the appended claims.

The embodiments of the invention in which an exclusive property or privilege is claimed are defined as follows:

1. A method of treating feed grains for livestock animals to temper the grain for mechanical processing which comprises adding to the grain as a wetting agent a treating material consisting essentially of a small but effective amount of a sarsasaponin.

2. A method according to claim 1 wherein the sarsasaponin is extracted from the Yucca or Agave plant.

3. A method according to claim 2 wherein the sarsasaponin is extracted from a Yucca plant of the family Lillaecae.

4. A method according to claim 3 of treating feed grains for livestock animals to temper the grain for steam flaking and enhancing the digestability of the grain which comprises:
    A) rolling the grain to disrupt the kernel organization and reduce the particle size,
    B) exposing the resulting grain flakes to steam to add moisture to the flakes, and
    C) prior to or during the rolling and steam flaking steps, adding as a wetting agent between about 9 to 20 grams dry weight per ton of grain of a sarsasaponin extracted from a Yucca plant of the family Lillaecae.

5. A method according to claim 4 wherein the sarsasaponin is added from an aqueous medium containing about 3 grams sarsasaponin dry weight per ounce of liquid.

6. A method according to claim 5 wherein the aqueous medium contains an antifreeze agent.

7. A method according to claim 1 wherein the sarsasaponin is added in amount between about 1 to 12 grams dry weight per ton of grain.

8. A method according to claim 1 wherein the digestability of the grain is also enhanced by adding sarsasaponin at a higher level in amount between about 9 to 20 grams dry weight per ton of grain.

9. A method according to claim 1 wherein the sarsasaponin is added from an aqueous medium containing about 3 grams sarsasaponin dry weight per ounce of liquid.

10. A method according to claim 9 wherein the aqueous medium contains an antifreeze agent.

11. A method according to claim 1 wherein the sarsasaponin is added to the grain prior to mechanical processing.

12. A method according to claim 1 wherein the sarsasaponin is added to the grain during mechanical processing.

13. A method according to claim 1 wherein the sarsasaponin is added to the grain following mechanical processing.

14. A method according to claim 1 wherein mechanical processing includes grinding or rolling, reconstituting, micronizing, steam flaking and mixing.

15. A method of increasing feed efficiency in the feeding of livestock animals by reducing the amount of feed required to produce a unit of animal tissue, said method comprising feeding said animals feed grain treated by the addition of sarsasaponin thereto according to the method of claim 1.

16. An animal feed composition comprising feed grain and a treating material consisting essentially of a small growth promoting amount of sarsasaponin.

17. A grain conditioning mixture for treating feed grain being processed into flakes to increase water intake of the grain improving gelatinization and digestability comprised of:

a Yucca extract containing sarsasaponin mixed with propylene glycol, and water whereby said mixture improves grain wetability, moisture intake and gelatinization when sprayed onto said feed, thereby increasing the volume of processed grain.

18. The mixture according to claim 17 in which said Yucca extract contains approximately 10% sarsasaponin.

19. A process for conditioning grain to improve water intake and gelatinization when undergoing a flaking process comprising:

mixing a Yucca extract containing sarsasaponin with propylene glycol; diluting said mixture of Yucca plant extract containing sarsasaponin and propylene glycol with water;

spraying said grain with said diluted mixture of Yucca extract containing sarsasaponin and propylene glycol evenly on said grain prior to delivery to flake processing machinery;

whereby moisture intake and gelatinization are improved and the volume of processed grain resulting from the flake process is increased.

20. The process according to claim 19 in which said Yucca plant extract contains approximately 10% sarsasaponin.

* * * * *

UNITED STATES PATENT AND TRADEMARK OFFICE
CERTIFICATE OF CORRECTION

PATENT NO. : 5,279,838

DATED : January 18, 1994

INVENTOR(S) : Larry C. McNeff

It is certified that error appears in the above-identified patent and that said Letters Patent is hereby corrected as shown below:

On title page,

Abstract, line 5, "sarasasaponin" should be --sarsasaponin--.

Column 2, line 10, "sarsasponins" should read --sarsasaponins--.

Column 2, line 10, "ratios" should be --rations--.

Column 2, line 48, "sarasaponin" should be --sarsasaponin--.

Column 3, line 5, "sarasasaponin" should be --sarsasaponin--.

Column 3, line 12, "sarasasaponins" should be --sarsasaponins--.

Column 3, line 16, "sarasasaponins" should be --sarsasaponins--.

Signed and Sealed this

Eighteenth Day of October, 1994

*Attest:*

BRUCE LEHMAN

*Attesting Officer*   *Commissioner of Patents and Trademarks*